United States Patent
Hugler

[15] 3,707,163
[45] Dec. 26, 1972

[54] CONTROL VALVE BLOCK FOR GASEOUS OR LIQUID FLUID MEDIA FOR UNIVERSAL APPLICATION

[72] Inventor: Klaus Hugler, Esslingen, Germany

[73] Assignee: Firma Robert Klinger Kunststoff-Spritzgusswerk, Asperglen Uber Schorndorf, Germany

[22] Filed: June 30, 1971

[21] Appl. No.: 158,499

[30] Foreign Application Priority Data

July 8, 1970 Germany..................P 20 33 736.4

[52] U.S. Cl.................................................137/271
[51] Int. Cl..............................................F15c 1/06
[58] Field of Search ......137/271, 608, 81.5; 251/367

[56] References Cited

UNITED STATES PATENTS 3,407,834  10/1968  Brandenberg.................137/271
3,534,757  10/1970  Doherty.......................137/271 X Primary Examiner—Henry T. Klinksiek
Assistant Examiner—Robert J. Miller
Attorney—Robert D. Flynn et al.

[57] ABSTRACT

To provide for universal programming of the ducting in hydraulic or gaseous valves, particularly for servo application, a plurality of superimposed elements are secured together; one of the elements forms a distribution unit with fluid connections therein, which, itself, may be composed of a pair of plates, one having valve openings and cylinder spaces formed therein and the other having valve units matching the cylinder spaces; a selectively replaceable programming plate, having ducts formed therein in accordance with a hydraulic connection program is secured to the distribution unit; the programming plate can be connected to one or more control valves, the alignment of the ducts in the control plate with the piston and cylinder openings in the distribution unit and in the control valves, as well as with selected power output valves being readily determinable and changeable, so that a universally applicable hydraulic unit can be constructed utilizing basic distribution unit components in which the programming plate, only, need to be changed to change the fluid circuit.

16 Claims, 5 Drawing Figures

CONTROL VALVE BLOCK FOR GASEOUS OR LIQUID FLUID MEDIA FOR UNIVERSAL APPLICATION

The present invention relates to a universal control block for valves controlling the flow of liquid or gaseous media, and more particularly to such a control block in which the valves themselves are incorporated, especially for servo applications, which is so arranged that the specific fluid connections can be readily changed by change of a single programming plate within the valve block.

Servo valves, and other controlled valves usually are three-way and four-way valves, incorporating additionally connections to, or directly within the same unit, working valves to admit pressure fluid to power pistons, the working valves themselves being controlled by pilot valves in some applications. The specific function of the valves, and the interconnection arrangement can be obtained by fixed connection of movable elements, such as control cams or the like associated with movable pistons. The functions-vs.-operating characteristics are thus predetermined by the structure itself and cannot be changed. Control blocks of this type are expensive since fluid media, particularly hydraulic pressure fluid must be distributed usually over a plurality of valves which may include spool, or slide valves having a number of ducts leading to the piston chambers thereof, which, in turn, may require operation of additional pilot valves.

Fluid distribution systems of this type, and particularly the manufacture of various parts of the working valves eventually controlling a pressure fluid to a power piston-cylinder arrangement are expensive. Costs can be reduced if plastic or other easily moldable substances are used; in many instances, however, use of plastic material introduces difficulties since the required tolerances and accuracies of manufacture are not readily obtained. Plastic valves additionally require special maintenance, for example by using oil-mist with compressed air, and plastic valve components are subject to high wear and tear.

If the valve blocks, and the control units are to accomodate various applications, in which fluid media are conducted by pipes of various standard sizes, and various standard, or random spacing, it is then necessary to either utilize adapters or to provide special connections if a change from one standard size to another is required by the general layout, unless a specially constructed valve body is to be used. Adaptation of fixed connections, the relative distances of pressure lines, or their sizes, to stock units then may require specially constructed adapter plates, or the incorporation of special connections in the base plate of the valve unit to be made. Such adapter plates are expensive, frequently useful only with certain standard sizes and conversions, and additionally present a stocking and storage problem if stock valve units are to be useful with a wide variety of standard, or even of non-standard laid out systems.

It is therefore an object of the present invention to provide a universally applicable valve block for fluid media, such as gases or liquid (compressed air; hydraulic pressure fluid or the like) which can be readily adapted to various layouts, and in which the function of the valves themselves can be adapted to many requirements without requiring the stocking of many different types of complete valve units.

SUBJECT MATTER OF THE PRESENT INVENTION

Briefly, the valve block comprises a plurality of superposed elements. One element includes a control valve, formed as a control valve block. A distribution unit with fluid connections therein is provided, which may, for example itself be made up of parallel plates, in which cylinder openings and matching pistons can be located. Additionally, a selectively replaceable programming plate is provided which is formed with control ducts. The programming plate is interposed between the distribution unit and the control valve, the fluid control ducts within the programming plate being arranged to interconnect the distribution unit with the control valve in accordance with a desired connection pattern, which may be termed a program.

The distribution unit has the pressure (and, if necessary, drain) connections applied thereto, and fluid is conducted through the distribution unit and then through the programming plate to the control valve, the control valve then acting in accordance with the control function, determined by the ducting in the programming plate, to open and close the valve units within the distribution unit itself.

The distribution unit preferably has two independently controllable valve units therein, the function and operation of which is determined by the distribution of fluid media as determined by the program cut into the programming plate, in the form of ducts.

In a preferred form of the application, each distribution unit has the connections thereto in accordance with predetermined standards arranged for standard sizes used in the industry. The valves within the distribution unit may, or may not, be spring loaded, as desired. The spaces formed within the distribution unit, or, within the programming plate can be closed off from the outside, or can be accessible from the outside and closed, for example by means of a plug.

In accordance with a feature of the invention, the valve seats in the plates forming the distribution unit, and the valves themselves are formed as concentrically located elements, the inner and out units being ring-shaped, and surrounded by a ring-shaped covering valve element. The inner and outer ring-shaped valves need not be concentric but, preferably, are eccentrically located if manufacturing convenience, or standard connection sizes are thereby satisfied.

The programming plate is interchangeable and the control ducts cut therein are located in accordance with the desired function of the universal control valve block. The interconnections then interconnect the various spaces and chambers within the distribution unit and the control valve. The programming plate itself can be made readily of plastic. Further, the valve plate and the various openings formed in the connection elements can be made of plastic, so that the control valves can be placed immediately on the programming plate itself, although it is equally possible to locate the control valves on any suitable space since it is interconnected with the lines of the universal block, in essence, only by fluid media ducts. The unit is thus extremely versatile; connections to the control valves need not be made through the distribution units since the distribution units can be connected directly to the control valves themselves. This has been found to be particularly advantageous when the control valves are to be operated by a foreign medium, or when the control valves are to be remotely located.

The distribution block is particularly suitable for liquid and gaseous media of varying pressures, and requiring various functions. The distribution unit can be utilized with an amplifier. The connections and ducts for the working fluid can be larger than the connections and ducts for the control elements themselves, so that the apparatus may function as a quantity amplifier. The various functions can be controlled readily by change of the programming plate, which has its output connections matching the distribution unit. The connections to the distribution units are standardized and thus special adapter plates or base plates are not required. The distribution plate can thereby function directly as a support for the valve plates and the valve units. The actual control valve of the unit can be separated from the valves in the distribution unit, to be readily replaceable, or can be remotely located. The interconnections thereto again will be standard so that the entire hydraulic arrangement becomes very versatile. For all sizes and standard distances of the distribution unit, only a single control valve, or a number of control valves, but all of the same size and type need be provided.

The connection plate of the valve and the programming plate are inexpensively made and thus do not require substantial storage costs or initial investment. The control valves themselves are always standard and of the same size and type, thus additionally decreasing storage and distribution costs. The difference between various functional capabilities of the universal control blocks can be obtained by interchange of the programming plate, so that a large number of functional fluid control units can be provided with a very small investment in storage and stocking. If special applications are required, the programming plate can readily be made for such special applications, the remaining parts being standard. The programming plate can be included in the control unit later, and is replaceable, thus facilitating shipment of units meeting various requirements.

The universal valve block can thus readily be adapted to desired functions, and used with many different and varying applications. The various chambers and spaces within the valve block can be independently interconnected by means of the programming plate, or separated therefrom, as determined by the program arranged thereon in the form of distribution ducts. The number of the distribution units and of the control valves themselves which are associated with the programming plate, and the arrangement of the programming plate as well as its size will depend on the eventual use of the entire unit.

The invention will be described by way of example with reference to the accompanying drawings, wherein.

Figure 1:
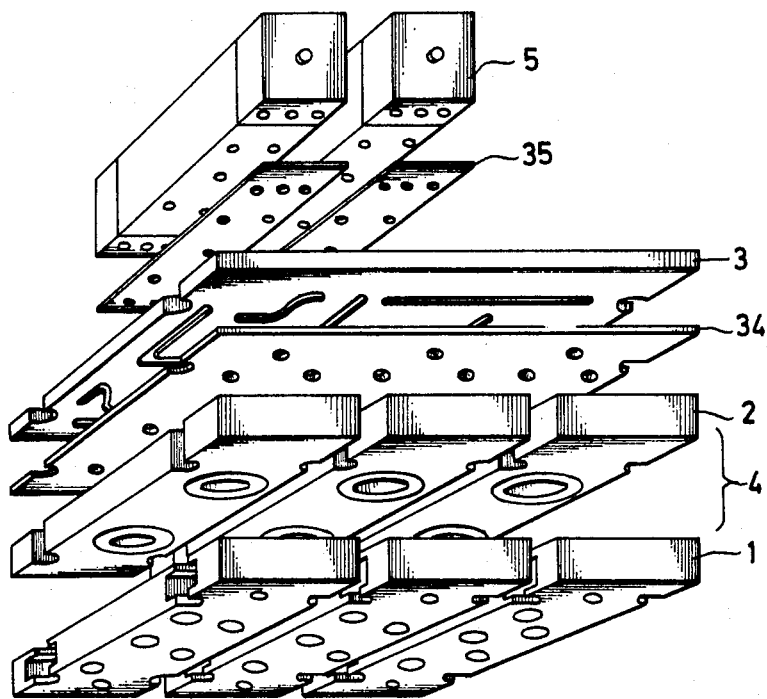
FIG. 1 is an exploded perspective view of the various portions of a universal control block, having two control valves.

Referring now to FIG. 1: The universal control block comprises three basic units: a distribution unit 4 which, in turn, includes a connection plate 1 and a valve plate 2; a programming plate 3; and a control valve 5. The assembly of FIG. 1 has six valves in the distribution unit and uses two control valves. Additionally, sealing plates or gaskets 34, 35 are interposed in the block and located on the two opposite sides of the programming plate 3.

The distribution unit 4 is formed with valve seats and valve closing elements. Programming plate 3 is formed with the necessary and required control ducts which, in dependence on the program cut into the programming plate, interconnect the valves of control valve blocks 5 with the chambers in which the valve elements of the valves in distribution unit 4 operate, so as to be actuated in a desired sequence and in accordance with a desired program.

Figure 2:
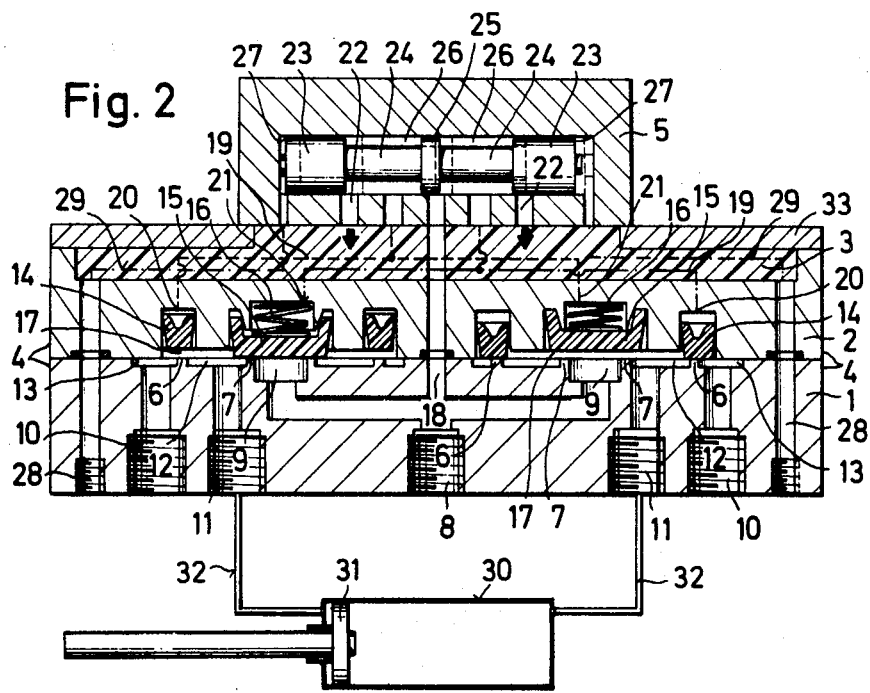
FIG. 2 is a longitudinal sectional view through an assembled universal control block having two distribution units and a single control valve.
Figure 3:
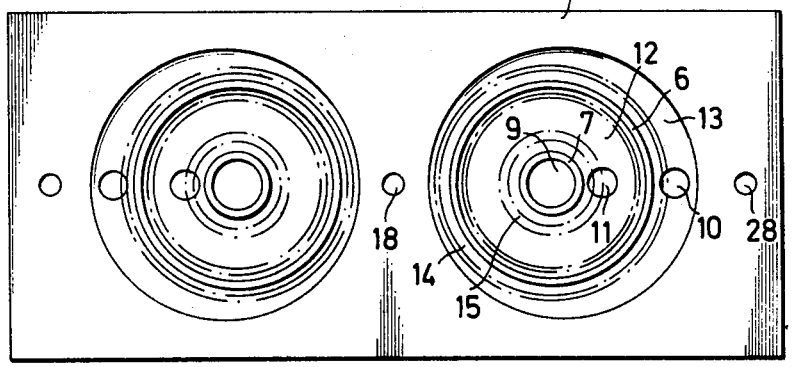
FIG. 3 is a top view of the connection plate of FIG. 2.
Figure 4:
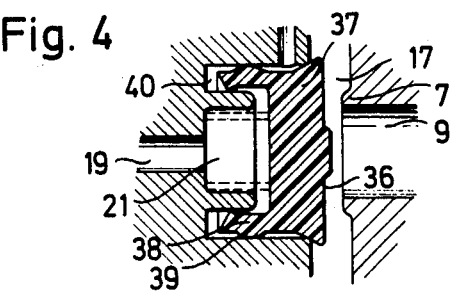
FIG. 4 is a transverse sectional view through a valve element of FIG. 2, to an enlarged scale.

FIGS. 2 to 4 illustrate the distribution unit 4 and the programming plate 3 in greater detail. Two distribution units with two valve seats, each, are illustrated.

Plate 1 of the two distribution units 4 has a pair of outer valve seats 6, located some distance from each other. Within the outer valve seat 6, inner valve seats 7 are located which, therefore, are completely surrounded by the respective associated outer valve seat 6 (FIG. 3). The pressure connection 8 applies working fluid medium and is preferably located centrally at the bottom side of connection plate 1, and connected by means of ducts 18 formed in connection plate 1 with pressure chambers 9. Further, duct 18 connects through the valve plate 2 with the control valve 5. Further connection to the connection plate 1 is so arranged and spaced that the position and spacing will comply with international standards. Outer working connection 10 to the outer connecting chambers 13, as well as inner working connections 11 to the inner connecting chambers 12 are provided. The various connection chambers are separated from each other by the valve seats 6 and 7. A valve plate 2 is located opposite plate 1, and formed with valve chambers opposite the valve seats 6 and 7. Outer and inner valve units 14 and 15 are located in the chambers, and recessed therein. The valve units 14, 15 usually are made of wear resistant rubber or plastic substance, essentially in the form of a shut-off plug. The inner elements 15 can, if desired, be additionally biased by means of spring 16.

The inner shut-off plugs 15 may be recessed to be deeper than the outer surface of plate 2, so that each distribution unit 4 forms chamber 17, closed off towards the outside between the connection plate 1 and the valve plate 2. Chamber 17 then has three connections 9, 12 and 13, connections 12 and 13 being controlled by means of plugs 14, 15 in accordance with the position of valve 5; thus, the interconnection between the three spaces or chambers 9, 12 and 13 can be selectively controlled.

Plugs 14, 15 located above valve plate 2 have control chambers 20, 21 formed therein, which communicate with control ducts 19. As desired, control ducts 19 communicate with the various chambers and the various connections 22 of the valve block 5.

Valve plate 2 has a programming plate 3 attached thereto, closed off toward the outside. The various control ducts 19 which are placed and connected in block 2 in accordance with a determined function, that is, to provide a specific program, are all formed in the programming plate 3. The control ducts 19 and the various branches therefrom can readily be made in the programming plate 3 which can be made of plastic material. Valve plate 2 can also be made of plastic material and, if so made and assembled with a plastic programming plate 3, can be readily sealed thereto without requiring special sealing arrangements or gaskets. Since programming plate 3 has to accept only control ducts, the dimension thereof can remain the same, independently of the size and number of the various pressure and working connections to accomodate different fluid media, or different flow rate, connected to the connection plate 1.

Valve 5 is a common type of four-way spool valve and attached directly to the programming plate 3. It has a spool piston rod 24 with control pistons 23 and a centrally located center piston 25. Two cylinder spaces 26 are thus defined, which, in dependence on the position of the pistons 23 and 25 selectively interconnect or separate the ducts 22 which terminate in the cylinder space 26. End chambers 27, at the outer respective sides of the piston 23 are connected by means of lines 29 in the programming plate and in the valve plate 2 with the connections 28 in connection plate 1. Line 28 will have the medium to move the spool piston 23 applied thereto, that is, to move piston 23 towards the right or left in FIG. 2. This connection can be made directly on valve block 5, if desired. If valve block 5 is remotely located, then interconnecting lines which can again be of standard size and with standard spacing are connectable to programming plate 3 on the one hand, and to the connections 22 on valve block 5 on the other.

The inner power connections 11 are connected over power lines 32 with a power cylinder 30 in such a manner that, depending on the supply of power pressure fluid, piston 31 will move towards the right or the left, for example to operate a press or the like. In the position shown, power fluid medium is supplied through connection 8 and flows over the open valve seat 7, at the right hand side, and then to the power connection 11 and over the power line 32 to power cylinder 30, causing the piston 31 to move towards the left. At the same time, the medium located at the other side of piston 31 in cylinder 30 can flow over power line 32 and the outer connection 11 over the outer, open valve seat 6 to the outer working connection 10 and then to be connected to a drain, or to be returned in a closed fluid circuit.

In the position shown in the drawings, the right side of the inner valve unit 15 is lifted by the power pressure, thus stressing the pressure spring 16. This opens the inner valve 7. At the left side of the drawing, spring 16 closes plug 15 securely on valve seat 7, which closing pressure is reinforced by means of pressure supplied over a duct 19, pressure being applied over duct 18 to the right cylinder space 26 of valve block 5.

The same pressure will be above and below the left inner valve plug 15, so that its associated spring 16 can seat plug 15 on the associated valve seat 7. As the inner left plug 15 is seated, the corresponding control duct 19 will also press down the outer plug 14 at the right side. The left outer plug 14, as well as the right inner plug 15 are open through a corresponding duct 19.

The control piston of valve 5 was moved to the left by the right connection 28 and line 29 and the right chamber 27. If pressure is placed on the inner connection 28 and the corresponding line 29 to the left chamber 27, then the piston will move towards the right, so that the intermediate piston 25 will free connection of pressure medium from duct 16 in the left cylinder space 26, reversing the position of the plug elements 14 and 15 and thus reversing the connection to the power piston 31 which will then move towards the right, with simultaneous opening to drain of the contents in cylinder 30 at the right of piston 31. Operation of the control valve 5 thus operates, as desired, the power piston 31. The universal control block can carry out other functions as well. It is only necessary to decrease, or increase the number of the distribution units 4, and to cut matching ducts 19, as required, into the programming plate 3. For example, only one inner or outer plug valve may be required; or more than two such plug units may be used. The inner plugs may be formed as valve discs, or may be formed with disc form or plug form seals, the outer plugs being essentially ring-shaped sealing elements.

FIG. 4 illustrates, in detail, the construction of a plug unit, for example plug 15. A base surface 36 is formed in body 37, located opposite valve seat 7. The base surface is spaced from valve seat 7 when the plug valve is open. The diameter of base surface 36 is larger than the diameter of the body 37 and merges into body 37 in a conical, tapered form. Body 37 extends rearwardly into a ring-shaped sealing lip 38 which is formed with a stiffening rib 39 fitting against the wall of chamber 21. The closing plug, or valve plug 15 is guided in the chamber 21 by means of a ring-shaped groove 40, in which lip 38 and rib 39 are fitted.

The plug 37 of the valve is thus guided to move in a longitudinal direction and seat directly on the valve seat 7, effecting secure closure. If necessary, ring-shaped valve elements 14 may be shaped similarly, however, with a central opening.

The universal control block for gaseous or liquid fluid media can be constructed, as desired, and can be assembled in desired form utilizing the same elements, and the same valve elements. Each chamber, sealed to the outside, has at least three connections, two of which can be interconnected in any desired selectable manner by the control valves, that is, by plugs 14, 15 which in turn are controlled by fluid, so that selected connections can be established between the various connecting lines leading to the universal unit.

Figure 5:
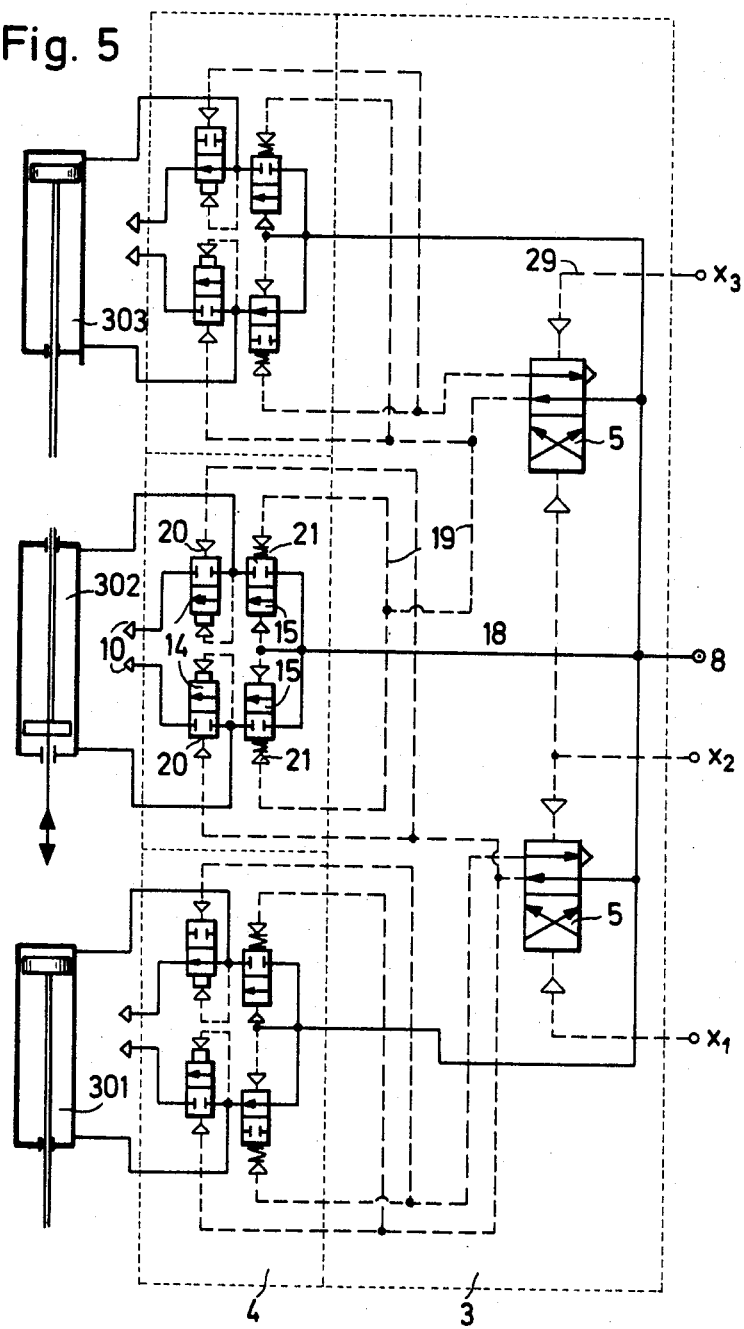
FIG. 5 is a schematic fluid circuit diagram of the unit in accordance with FIG. 1.

FIGS. 1 and 5, together, illustrate the versatility of the control block. The functions illustrated in the connecting diagram of FIG. 5 can readily be assembled from base building units, in combination with a suitable control plate. Three power, or output work cylinders 301, 302, 303 (FIG. 5) are to provide output power in selected operating sequences. Six similar connecting units 4 are provided, each having a pair of valve seats 14, 15. Two similar control valve blocks 5 are provided. The entire assembly of connecting units 4, valve blocks 5 and the connecting plate form one common control unit. Thus, very few parts and which are similar for similar functions can be combined, depending on requirements and designed functions to be obtained. The only element which has to be individually fitted or made is the programming plate 3 with its control channels or ducts 19 which has to be selected to provide for proper interconnection depending on the program function to be carried out.

Cylinders 301 and 303 are placed under pressure in their terminal positions. The piston of cylinder 302 is maintained in its position by exhaust medium. Let it be assumed that compressed air is the pressure fluid, then piston 302 will be held in position by the exhaust air. Let it be assumed that the lower control valve block 5 has a pressure signal $x_1$ applied thereto, then the piston of cylinder 301 is controlled to move in the other terminal position, whereas the piston of cylinder 302 is freed to move under outside influences or forces. The piston of cylinder 303 retains its position as shown in FIG. 5. A further pressure signal applied over connection $x_2$, that is, applied to both the lower as well as the upper control valve block 5 places compressed air on the piston of cylinder 302, thus locking the piston in the position into which it was moved, for example by an outside force, during the immediately preceding part of the cycle. The piston of cylinder 301 is returned to its formal position, and the piston of cylinder 303 is moved into the other, that is, the lower position.

Applying a pressure signal over line $x_3$ on the upper control valve 5 returns the cylinder 303 in the first position, that is, in the position shown in FIG. 5, while keeping the piston of cylinder 302 in its position by a balance in non-exhaustible air on both faces of the piston. The piston of cylinder 301 remains in a terminal position shown in FIG. 5. Thus, a signal on line $x_3$ restores the position at the start.

Various sequences of operations can thus be controlled by applying pressure signals to selected portions of the system. The pressure signals applied over lines $x_1$, $x_2$, $x_3$ can be applied directly to the valve blocks 5 or, if desired, to specifically formed connections in plate 3, or through the distribution unit 4 by ducts leading through the unit and through the programming plate.

The distribution unit itself can be formed of a pair of contiguous plates of plastic with non-plastic valve seats formed therein. Thus construction of the plates is simple, while providing reliable, wear-resistant valve units within the distribution unit. The programming plate can be of the same plastic material. The valve units themselves are plugs of resilient material, which are adapted to face the valve seats, the greater diameter of the plug than the remainder seating on the non-plastic valve seat inserts formed in the distribution unit. The distribution unit itself, if made of two parts, can be readily manufactured with inserts of non-plastic material to be placed therein since the faces of the valves will be accessible when the two plates 1, 2 of the distribution units are separate.

The present invention has been described specifically in connection with a control valve, for example for combination with a servo unit; various changes and modifications may be made depending on the specific application for which the valve block unit is to be used without departing from the inventive concept.

The specific connections to input and output lines can be as desired. As best seen in FIG. 2, if the layout requires, valves 6, 7 – 14, 15 may be eccentrically located.

I claim:
1. Universal valve block for gaseous or liquid fluid media comprising
a plurality of superimposed elements,
one element forming a distribution unit (4) having fluid connections therein;
and a selectively replaceable programming plate (3) having fluid connections and control ducts (19) formed therein, the control ducts being located to interconnect the fluid connections formed therein to fluid connections of the distribution unit (4);
the distribution unit being formed with a chamber (17) sealed from the outside and divisible into at least three chamber portions (9, 12, 13);
at least two independent controllable valve units (14, 15) located in the distribution unit, the control valve ducts (19) in the programming plate communicating with selected ones of said valve units to permit independent individual operation of the valve units and hence division of the chamber into the connecting portions selectively, as determined by the connections effected by the pressure connected by the ducts (19) of the programming plate.

2. Block according to claim 1, wherein the distribution unit comprises
a pair of plates (1, 2), said plates being formed, selectively, with interconnectable pressure and drain connections (8, 10 11); said chamber portions (9, 12, 13);
valve seats (6, 7) separating said chamber portions; and
said valve units (14, 15);
and connection means to the control ducts (19) formed in the control plate.

3. Block according to claim 2, including spring means engaging at least one of said valve units and biasing said valve units to a predetermined position.

4. Block according to claim 2, wherein said valve seats (6, 7) and said valve units (14, 15) in the distribution unit are located one within the other.

5. Block according to claim 4, wherein an inner valve seat (7) and an associated valve unit (15) are surrounded by a ring-shaped outer valve seat (6) and an associated outer valve unit (14).

6. Block according to claim 5, wherein the inner and outer valve seats and associated valve units are located eccentrically.

7. Block according to claim 2, wherein the valve plate (2) of the distribution unit (4) is interposed between the connection plate (1) and the programming plate (3), the control ducts (19) formed in the programming plate connecting (20, 21) directly with said valve units (14, 15) and further connecting (22) with the connection means from the connecting plate.

8. Block according to claim 1, wherein the distribution unit comprises a connection plate (1) and a valve plate (2) located thereon,
the connection plate (1) being formed with pressure and drain connections (8, 10, 11), valve seats (6, 7) and said chamber portions (9, 12, 13);

and the valve plate (2) includes said valve units (14, 15) and being formed with associated control chambers (20, 21) and connection means to said chambers, valve units, and to the control ducts formed in the control plate.

9. Block according to claim 1, including a control valve block adapted for connection to the connection means from the programming plate (3).

10. Block according to claim 9, wherein the control valve block (5) is secured to the programming plate and in direct fluid communication therewith.

11. Block according to claim 1, wherein the distribution unit is formed of a pair of contiguous plates (1, 2) of plastic material having a non-plastic valve seat therein (6, 7);

and said programming plate is formed of plastic material.

12. Block according to claim 1, wherein the valve units (14, 15) are formed as plugs (37) of resilient material, the units being adapted to face said valve seat;

said units have a base surface (36) facing the respective valve seat which has a greater diameter than the remainder of the plugs (37), the base surface region merging in conical extension with the remainder of the plug.

13. Block according to claim 12, including a rearwardly extending sealing lip (38) formed on the plug (37);

and a circumferentially extending stiffening rib (39) extending towards the walls of the element containing the valve unit formed on the sealing ring.

14. Block according to claim 13, wherein the distribution unit (4) is formed with valve chambers (20, 21) in which the valve units (14, 15) are located;

the valve chambers being formed with a ring-shaped groove (40) receiving the sealing lip (38) and the stiffening rib (39).

15. Block according to claim 1, wherein the programming plate is additionally formed with duct means (18) adapted to connect pressure fluid to said plate to be distributed by said plate in accordance with the connection path of the control ducts.

16. Block according to claim 1, including a plurality of control valve blocks;

and wherein the valve block comprises a plurality of distribution units (4), said programming plate being formed with means establishing connection with input lines and output lines and said programming plate is common to said plurality of control valve blocks and to said plurality of distribution units and is formed with control ducts selectively establishing programmed flow communication between respective selected valve blocks, distribution units, input lines and output lines.

* * * * *